3,153,652
11-(AMINOALKYLIDENE)-MORPHANTHRIDINE
DERIVATIVES
Alexander E. Drukker, Milwaukee, and Claude I. Judd, Mequon, Wis., assignors to Colgate-Palmolive Company, a corporation of Delaware
No Drawing. Filed Feb. 2, 1962, Ser. No. 170,803
8 Claims. (Cl. 260—293)

This invention relates to novel chemical compounds and processes of preparing the same. More particularly, this invention is concerned with novel basic 5,6-dihydromorphanthridine derivatives, processes of producing them and pharmacological and therapeutic uses for such compounds.

According to one aspect of this invention there are provided novel compounds of the formula

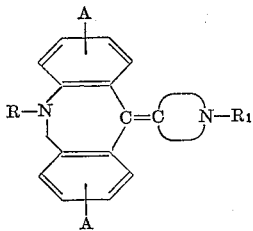

Formula 1 wherein A and $A_1$ are hydrogen, a halo group such as the chloro and bromo groups, a lower alkoxy such as methoxy and ethoxy, a lower alkyl such as methyl, a lower alkyl-thio such as thiomethyl and thioethyl, and trifluoromethyl, R and $R_1$ are the same or different groups such as hydrogen, a lower alkyl (viz., eight carbons or less) such as methyl, ethyl, propyl, isopropyl and butyl, a lower alkenyl such as allyl, a lower alkynyl such as propargyl, an aralkyl such as a phenyl-lower alkyl including benzyl, phenethyl, phenylpropyl, phenylisopropyl and p-chlorobenzyl, as well as diphenylmethyl, trityl and naphthylmethyl, or a phenyl-lower alkenyl such as cinnamyl, and

is a cyclic amino group such as 3-piperidyl, 4-piperidyl, 3-pyrrolidyl, 3-homopiperidyl and 4-homopiperidyl.

Such compounds of this invention in which neither R nor $R_1$ are hydrogen are produced by reacting an 11-alkali metal salt of a 5-substituted-5,6-dihydromorphanthridine with a cyclicamino ketone to produce a 5-substituted - 11 - (N - substituted - hydroxy - cyclicamino)-5,6-dihydromorphanthridine, which upon dehydration yields a 5 - substituted - 11 - [(N - substituted - cyclicamino)-ene]-5,6-dihydromorphanthridine. This process can be represented as follows:

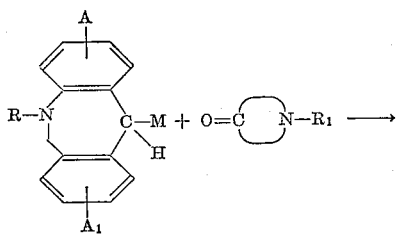

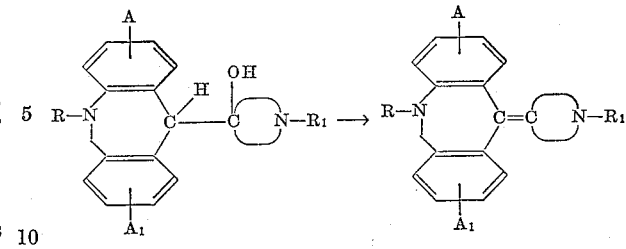

wherein M is an alkali metal such as lithium, and A, $A_1$, R, $R_1$ and

have the assigned significance.

The 11-alkali metal salts of 5-substituted-5,6-dihydromorphanthridine used in the process are prepared by reacting a 5-substituted-5,6-dihydromorphanthridine with an alkali metal lower alkyl or aryl compound such as butyl lithium or phenyl lithium, advisably in about 10% excess. The reaction is readily effected by bringing the reactants together in an inert anhydrous liquid reaction medium such as pentane, hexane, ethyl ether, xylene, toluene, tetralin, cumene and tetrahydrofuran, and compatible mixtures of such solvents. The reaction can be effected at room temperature or elevated temperatures depending on the reactivity of the alkali metal compound used in the process. The reaction is substantially complete in 1 to 4 hours. Following termination of the reaction the product can be isolated, if desired, but this is ordinarily not done since it can be used as present in the reaction mixture.

Some of the 11-alkali metal salts of 5-substituted-5,6-dihydromorphanthridines which are produced as described are the 11-lithium salts of 5-methyl-5,6-dihydromorphanthridine, 5 - ethyl - 5,6 - dihydromorphanthridine, 5-isopropyl - 5,6 - dihydromorphanthridine, 5-benzyl - 5,6 - dihydromorphanthridine, 5 - phenethyl - 5,6-dihydromorphanthridine, 5 - allyl - 5,6 - dihydromorphanthridine and 5-cinnamyl-5,6-dihydromorphanthridine.

Some of the N-substituted cyclicamino ketones which can be used in the process are N-substituted piperidones, pyrrolidones, and homopiperidones such as N-methyl-3-piperidone, N - ethyl - 4 - piperidone, N - methyl - 3-pyrrolidone, N - ethyl - 3 - pyrrolidone, N - benzyl-3 - piperidone, N - benzyl - 4 - piperidone, N - benzyl-3 - pyrrolidone, N - phenethyl - 3 - pyrrolidone, N - cinnamyl-3-piperidone, N-allyl-4-piperidone, N-methyl-3-homopiperidone and N-benzyl-4-homopiperidone. The N-substituted 2-piperidones, 2-pyrrolidones and 2-homopiperidones which are cyclic amides or lactams, are not suitable for use in the process.

The reaction between the N-substituted cyclicamino ketone and an 11-alkali metal salt of a 5-substituted-5,6-dihydromorphanthridine is readily effected by combining the reactants, advisably in equimolar amounts, in a suitable inert high boiling liquid reaction medium such as dioxane, toluene, xylene, ethyl ether, tetralin, cumene and tetrahydrofuran. The reaction mixture from the formation of the 11-alkali metal salt of the 5-substituted-5,6-dihydromorphanthridine can be used as the reactant and solvent source to which the appropriate ketone reactant can be added. The reaction proceeds at room temperature although slightly elevated temperatures can also be used. About 3 to 20 hours is generally adequate to substantially complete the reaction. After the reaction is terminated the product can be recovered by filtering the reaction mixture, distilling off the solvent and fractionally distilling the high boiling base in vacuo.

Some of the compounds which are produced according to this process are:

5-methyl-11-(N-methyl-4-hydroxy-4-piperidyl)-5,6-dihydromorphanthridine,
5-benzyl-11-(N-ethyl-3-hydroxy-3-piperidyl)-5,6-dihydromorphthanthridine,
5-allyl-11-(N-benzyl-3-hydroxy-3-pyrrolidyl)-5,6-dihydromorphanthridine,
5-cinnamyl-11-(N-allyl-3-hydroxy-3-homopiperidyl)-5,6-dihydromorphanthridine and
5-ethyl-11-(N-methyl-3-hydroxy-3-piperidyl)-5,6-dihydromorphanthridine.

These and other compounds of this invention can be converted to esters by conventional procedures. Of especial importance are those in which the acyl is a residue of a lower aliphatic carboxylic acid such as acetyl and propionyl.

The free hydroxy containing compounds, or esters thereof, having a cleavable or removable substituent on one or both of the nitrogens can be subjected to appropriate conditions such as reductive or hydrolytic cleavage to remove such groups. Thus, 5-methyl-11-(N-trityl-4-hydroxy-4-piperidyl)-5,6-dihydromorphanthridine can be converted in this way to 5-methyl-11-(4-hydroxy-4-piperidyl)-5,6-dihydromorphanthridine.

Other compounds which are produced in this way are 5-methyl-11-(3-hydroxy-3-piperidyl)-5,6-dihydromorphanthridine,
5-ethyl-11-(3-hydroxy-3-pyrrolidyl)-5,6-dihydromorphanthridine,
11-(3-hydroxy-3-homopiperidyl)-5,6-dihydromorphanthridine,
11-(N-methyl-4-hydroxy-4-piperidyl)-5,6-dihydromorphanthridine, as well as the acetyl and propionyl esters thereof.

To effect the dehydration of the 11-(hydroxy-cyclicamino)-5,6-dihydromorphanthridines as well as those compounds containing substituents on the nitrogen in the 5 position and/or on the nitrogen of the cyclicamino group, it is advisable to have the hydroxy group present as an acyloxy derivative such as the acetate or other similar acyloxy derivative of a lower aliphatic monocarboxylic acid including the propionate. Acid halides and anhydrides can be used to form the esters in conventional procedures. Dehydration of the resulting acyl derivative is achieved by pyrolysis through heating of the compound at an elevated temperature, such as 200°–500° C., to liberate the appropriate aliphatic acid. The residue can then be distilled under reduced pressure to obtain the 11-[(cyclicamino)ene]-5,6-dihydromorphanthridine.

Some of the compounds which are produced in this manner are:

5-methyl-11-(N-methyl-4-piperidylene)-5,6-dihydromorphanthridine,
5-phenethyl-11-(N-ethyl-3-piperidylene)-5,6-dihydromorphanthridine,
5-allyl-11-(N-cinnamyl-4-piperidylene)-5,6-dihydromorphanthridine,
5-methyl-11-(N-methyl-3-pyrrolidylene)-5,6-dihydromorphanthridine,
5-benzyl-11-(N-ethyl-3-pyrrolidylene)-5,6-dihydromorphanthridine,
5-cinnamyl-11-(N-allyl-3-piperidylene)-5,6-dihydromorphanthridine,
11-(N-methyl-4-piperidylene)-5,6-dihydromorphanthridine,
5-methyl-11-(3-piperidylene)-5,6-dihydromorphanthridine,
5-ethyl-11-(3-pyrrolidylene)-5,6-dihydromorphanthridine,
5-phenethyl-11-(3-homopiperidylene)-5,6-dihydromorphanthridine, and
11-(4-piperidylene)-5,6-dihydromorphanthridine.

According to a further aspect of this invention there are provided novel basic 5,6-dihydromorphanthridines of the formula

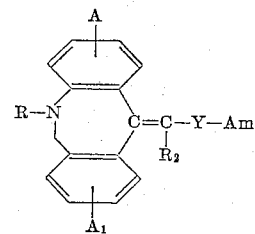

Formula 2 wherein A, $A_1$ and R have the assigned significance, $R_2$ is hydrogen, a lower alkyl (viz., eight carbons or less) such as methyl, ethyl, propyl, isopropyl and butyl, a lower alkenyl such as allyl, phenyl, an aralkyl such as a phenyl-lower alkyl including benzyl, phenethyl, phenylpropyl, phenylisopropyl and p-chlorobenzyl or a phenyl-lower alkenyl such as cinnamyl, Y is a chemical bond or a lower straight or branched alkylene as of 1 to 8 carbons including methylene, ethylene, propylene and isopropylene, and Am is a nitrogen containing group such as a cyclicamino group like 2-, 3- or 4-pyridyl, 2-, 3- or 4-piperidyl, 2- or 3-pyrrolidyl, 2-, 3- or 4-homopiperidyl with or without an N-substituent such as a lower alkyl including methyl, ethyl and propyl, phenyl, an aralkyl such as phenyl-lower alkyls including benzyl and phenylethyl as well as diphenylmethyl, trityl and naphthylmethyl, a lower alkenyl such as allyl or a phenyl-lower alkenyl such as cinnamyl, and Am represents the group

when Y is a lower straight or branched alkylene wherein $R_3$ and $R_4$ are the same or different groups including hydrogen, a lower alkyl such as methyl, ethyl, propyl, isopropyl and butyl, a lower alkenyl such as allyl, an aryl group and particularly phenyl including nuclear substituted phenyl groups, aralkyl groups and particularly phenyl-lower alkyl groups including benzyl, phenylethyl and phenylisopropyl as well as diphenylmethyl, trityl and naphthylmethyl, cycloalkyl groups and particularly such groups having 5 to 7 carbons including cyclophenyl and cyclohexyl, cycloalkyl-lower alkyl groups such as cyclohexyl-methyl and cyclopentyl-ethyl, quinuclidinyl and groups in which

represents a group such as morpholino, pyrrolidino, piperidino, 1,2,3,4-tetrahydroquinolino, 1,2,3,4-tetrahydroisoquinolino, N-lower alkyl-piperazino groups such as N- methylpiperazino and N-(phenyl-lower alkyl)-piperazino groups such as N-benzyl-piperazino and 4-(alpha-methylphenethyl)-piperazino.

Such compounds of this invention in which $R_3$ and $R_4$ are not hydrogen and the cyclicamino groups represented by Am have N-substituents are produced by reacting an 11-alkali metal salt of a 5-substituted-5,6-dihydromorphanthridine with an appropriate aminoaldehyde or aminoketone to produce an intermediate 5-substituted-11-(alpha-hydroxyalkyl-amino) - 5,6 - dihydromorphanthridine which upon dehydration yields a 5-substituted-11-(alpha - alkylidene - amino) - 5,6 - dihydromorphanthridine. This process may be represented as follows:

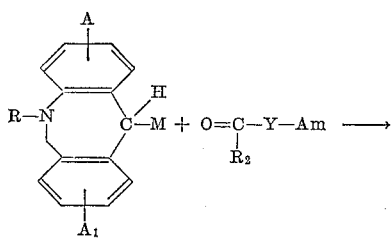

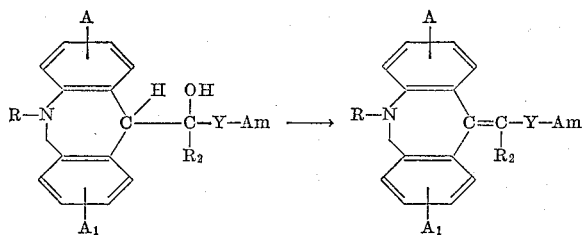

wherein A, $A_1$, M, Y, R, $R_2$ and Am have the assigned significance, but R is not hydrogen and Am is not a primary or secondary amino group.

The first step of this process in which an aminoaldehyde or aminoketone is reacted with an 11-alkali metal salt of a 5-substituted-5,6-dihydromorphanthridine is readily effected using the reaction conditions described previously in which a cyclicamino ketone was used.

Some of the amino aldehydes which can be used in the process are dimethylaminoacetaldehyde, pyrrolidinoacetaldehyde, N-methyl-4-piperazinopropionaldehyde, N-o-chlorobenzyl-N-methylaminobutyraldehyde, N-p-methoxybenzyl-N-2-pyridylaminoacetaldehyde, 7-(N,N - diallylamino)-heptaldehyde, 8-(N-propargyl-N-methyl)-aminooctaldehyde, morpholinoacetaldehyde, isoindolinoacetaldehyde, diphenylaminopropionaldehyde, dibenzylaminobutyraldehyde, 5-(N-phenyl - N - ethylamino)-valeraldehyde, 8-morpholino-caprylaldehyde, 2-piperidylacetaldehyde, 3-piperidylacetaldehyde, 4-piperidylacetaldehyde, 2-pyrrolidylacetaldehyde, 3-pyrrolidylacetaldehyde, 3-homopiperidylacetaldehyde, 3-(3-piperidyl)-propionaldehyde, 4-(3-pyrrolidyl)-butyraldehyde, 2-pyridyl propionaldehyde, 4-pyridyl acetaldehyde and 4-pyridylaldehyde.

Representative of the aminoketones which can be used in the process are 2-pyridyl acetone, 3-acetyl pyridine, 3-propionylpyridine, 4-pyridyl propyl ethyl ketone, N-methyl-2-piperidyl acetone, N-benzyl-3-acetyl piperidine, N-cinnamyl-3-propionyl piperidine, N-ethyl-3-acetyl pyrrolidine, N-allyl-2-pyrrolidyl acetone, 3-acetyl homopiperidine, dimethylaminoethyl methyl ketone, diethylaminomethyl phenyl ketone, diphenylaminobutyl benzylketone, dicyclohexylaminopropyl ethyl ketone, piperidinopropyl benzyl ketone, pyrrolidinoethyl methyl ketone, 4-methylpiperazinoethyl benzyl ketone, 3-quinuclidinylmethyl ketone and N-phenyl-N-benzylaminopentyl methyl ketone.

Some of the novel intermediate 5-substituted-11-(alpha-hydroxyalkyl-amino)-5,6-dihydromorphanthridines produced by the described reaction are:

5-methyl-11-(1-hydroxy-2-dimethylaminoethyl)-5,6-dihydromorphanthridine, 5-benzyl-11-(1-hydroxy-1-methyl-2-piperidinoethyl)-5,6-dihydromorphanthridine, 5-allyl-11-(1-hydroxy-1-benzyl-3-pyrrolidinopropyl)-5,6-dihydromorphanthridine, 5-cinnamyl-11-(1-hydroxy-1-allyl-3-homopiperidinopropyl)-5,6-dihydromorphanthridine, 5-ethyl-11-(1-hydroxy-3-dibenzylaminopropyl)-5,6-dihydromorphanthridine, 5-propyl-11-(1-hydroxy-2-diethylaminoethyl)-5,6-dihydromorphanthridine, 5-ethyl-11-[1-hydroxy-2-(N-ethyl-3-piperidyl)ethyl]-5,6-dihydromorphanthridine and 5-methyl-11-[hydroxy-(N-methyl-2-pyrrolidyl)methyl]-5,6-dihydromorphanthridine.

The 5-substituted-11-(alpha-hydroxyalkyl-amino)-5,6-dihydromorphanthridines can be converted to esters, as previously stated, of the formula

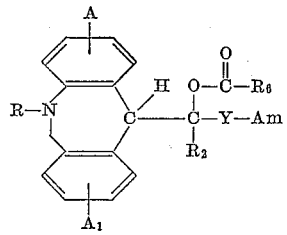

wherein $R_6$ represents a lower alkyl and particularly methyl, ethyl, isopropyl and butyl and A, $A_1$, R, $R_2$, Y and Am have the assigned significance. These esters can be readily produced by reacting a lower aliphatic carboxylic acid anhydride or an acyl halide with the 5-substituted-11 - (alpha - hydroxy - alkyl - amino) - 5,6 - dihydromorphanthridines according to conventional ester formation reaction conditions. The acetate, propionate and butyrate esters as of the compounds named above can be produced in this way.

N-substituents which are cleavable can be removed by the procedures described previously.

The compounds just described as well as other compounds within the scope of this invention can be pyrolyzed in the form of esters of lower aliphatic carboxylic acids, by the process previously described to produce 11-(alpha-alkylidene - amino) - 5,6 - dihydromorphanthridines including:

5-methyl-11[1-(2-dimethylaminoethylidene)]-5,6-dihydromorphanthridine, 5-benzyl-11-[1-(1-methyl-2-piperidinoethylidene)]-5,6-dihydromorphanthridine, 5-allyl-11-[1-(1-benzyl-3-pyrrolidinopropylidene)]-5,6-dihydromorphanthridine, 5-cinnamyl-11-[1-(1-allyl-3-homopiperidinopropylidene)]-5,6-dihydromorphanthridine, 5-ethyl-11-[1-(3-dibenzylaminopropylidene)]-5,6-dihydromorphanthridine, 5-propyl-11-[1-(2-diethylaminoethylidene)]-5,6-dihydromorphanthridine, 5-methyl-11-[1-(2-methyl-3-dimethylaminopropylidene)]-5,6-dihydromorphanthridine, 5-methyl-11-[1-(3-dimethylaminobutylidene)]-5,6-dihydromorphanthridine, 5-ethyl-11-{1-[2-(N-ethyl-3-piperidyl)ethylidene]}-5,6-dihydromorphanthridine and 5-methyl-11-(N-methyl-2-pyrrolidyl)methylidene-5,6-dihydromorphanthridine.

It has also been discovered according to this invention that the 5,6-dihydromorphanthridines of the formula

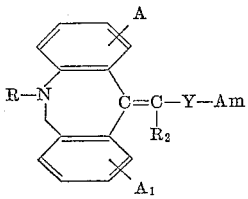

wherein A, A₁, R, R₂, Y and Am have the significance previously assigned, can be produced by reacting a 5-substituted-5,6-dihydro-11-morphanthridone with a disubstituted aminoalkyl metal halide to produce an 11-hydroxy-11-(disubstituted aminoalkyl)-5-substituted-5,6-dihydromorphanthridine which upon dehydration yields an 11-(disubstituted aminoalkylidene)-5-substituted-5,6-dihydromorphanthridine. This process can be represented as follows:

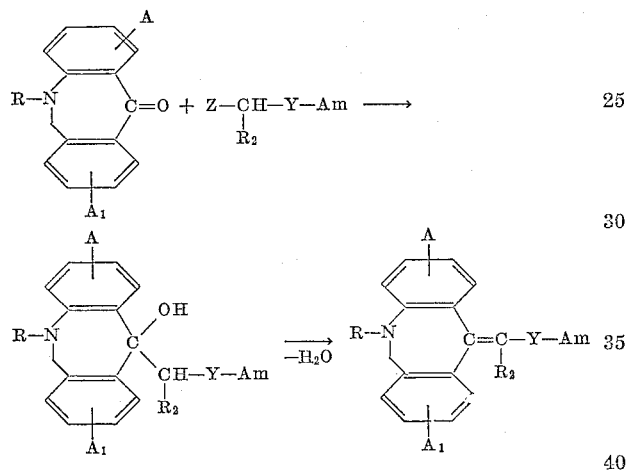

wherein Z is lithium or the group X—M— in which X is a reactive halogen and M is a reactive metal such as magnesium and A, R, Y and Am have the significance previously assigned but Am is not a primary or secondary amino group and R is not hydrogen.

Some of the 5-substituted-5,6-dihydro-11-morphanthridones which can be used in the process are:

5-methyl-5,6-dihydro-11-morphanthridone,
2-chloro-5-ethyl-5,6-dihydro-11-morphanthridone,
9-chloro-5-ethyl-5,6-dihydro-11-morphanthridone,
3-methyl-5-benzyl-5,6-dihydro-11-morphanthridone,
5-allyl-5,6-dihydro-11-morphanthridone,
5-cinnamyl-5,6-dihydro-11-morphanthridone, and
5-phenethyl-5,6-dihydro-11-morphanthridone.

5-methyl-5,6-dihydro-11-morphanthridone is reported in Liebig's Annalen der Chemie 594, 89 (1955) and other such 5-substituted compounds can be produced as described there. The preparation of this compound by a different route is also illustrated in the examples infra. Of course, other similar compounds can be produced by the same process as is more fully described hereinafter.

Representative of the disubstituted aminoalkyl metal halides which can be used in the process are:

Dimethylaminoethyl magnesium chloride,
Diethylaminoethyl magnesium bromide,
Dibenzylaminopropyl lithium,
Diallylaminoisopropyl magnesium chloride,
N-methyl-N-benzylaminopropyl magnesium chloride,
Di-phenethylaminoethyl magnesium chloride,
Di-cinnamylaminoethyl magnesium chloride,
Pyrrolidinoethyl magnesium chloride,
Homopiperidinopropyl magnesium chloride, and
Piperidinomethyl magnesium chloride.

The disubstituted aminoalkyl metal halides used in the first step are Grignard reagents which are produced by conventional methods such as disclosed in U.S. Patent 2,996,503 and German Patent 1,109,166.

Reaction between the disubstituted aminoalkyl metal halide and the 5-substituted-5,6-dihydro-11-morphanthridone is conveniently effected by bringing the reactants together in admixture under conditions generally used for reacting a Grignard reagent with a ketone to form a tertiary alcohol. The reactants are advisably combined in an anhydrous ether such as ethyl ether, tetrahydrofuran or ethyl ether with benzene. After the reactants have been brought together the mixture can be heated such as at reflux to promote the reaction. After the reaction is terminated water is added to the reaction mixture to hydrolyze the Grignard adduct to the desired tertiary alcohol. The resulting product can then be isolated from the mixture such as by evaporating the solvent. The product can then be recrystallized from a suitable medium, such as benzene, if desired.

The same conditions can be used when a disubstituted aminoalkyl lithium is employed in the reaction.

Some of the 11-hydroxy-11-(disubstituted aminoalkyl)-5-substituted-5,6-dihydromorphanthridines which are produced as described are:

11-hydroxy-11-(3-dimethylaminopropyl)-5-methyl-5,6-dihydromorphanthridine,
11-hydroxy-11-(2-diethylaminoethyl)-5-ethyl-5,6-dihydromorphanthridine,
11-hydroxy-11-(diallylaminomethyl)-5-allyl-5,6-dihydromorphanthridine,
11-hydroxy-11-(3-dibenzylaminopropyl)-5-benzyl-5,6-dihydromorphanthridine,
11-hydroxy-11-(3-piperidinopropyl)-5-methyl-5,6-dihydromorphanthridine,
11-hydroxy-11-(2-pyrrolidinoethyl)-5-ethyl-5,6-dihydromorphanthridine and
11-hydroxy-11-(3-dicyclohexylaminopropyl)-5-benzyl-5,6-dihydromorphanthridine.

The compounds where R is hydrogen are produced by cleavage of appropriate groups as previously described.

The 11-hydroxy-11-(disubstituted aminoalkyl)-5-substituted-5,6-dihydromorphanthridines can be treated with a variety of dehydrating agents to form the 11-(disubstituted-aminoalkylidene)-5-substituted-5,6 - dihydromorphanthridines. Some of the dehydrating agents which can be used are acetyl chloride, thionyl chloride, acetic anhydride, potassium bisulfate and concentrated hydrochloric acid. Solvents that are useful when acetyl chloride or a similar dehydrating agent is employed are chloroform and methylene chloride. Reflux of the reaction mixture promotes reaction. The dehydration is usually essentially complete in an hour. Evaporation of the solvent and recrystallization of the product gives a solid of good purity.

Such a dehydration reaction gives the resulting product in far greater yield and greater ease than the pyrolysis reaction that is necessary when the hydroxy group is on the carbon alpha to the 11 position carbon in the morphanthridine group.

By following the described procedures there can be produced 11-(disubstituted aminoalkylidene)-5-substituted-5,6-dihydromorphanthridines such as previously named.

It has also been discovered according to the present invention that the 5-substituted-5,6-dihydro-11-morphanthridones can be produced in good yields by reacting a 6,11(5H)-morphanthridinedione with a ketal forming agent to form a 6,11 - (5H) - morphanthridinedione-11-ketal, reacting said compound as an alkali metal salt with a suitable alkylating agent to form a 5-substituted-6,11-(5H)-morphanthridinedione-11-ketal, reducing the 6-keto group in such compound to form a 5-substituted-5,6-dihydro-11-morphanthridone-11-ketal, and hydrolyzing said ketal to form a 5-substituted-5,6-dihydro-11-morphanthridone. This process can be represented as follows:

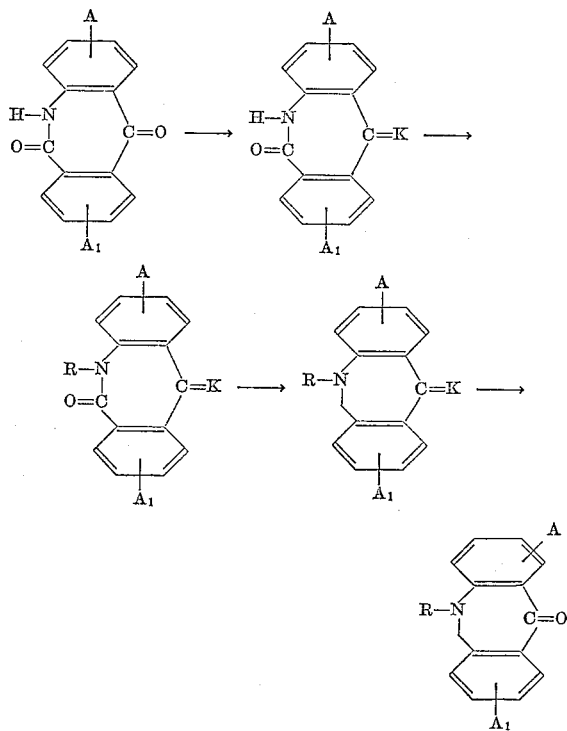

wherein A, A₁ and R have the significance previously assigned but R is not hydrogen in these formulas, and K represents two identical lower alkoxy groups such as methoxy or ethoxy or a lower alkylenedioxy group such as ethylenedioxy or propylenedioxy, thereby forming a ketal.

Representative 6,11(5H)-morphanthridinedione starting materials for use in this process are disclosed in U.S. Patent 2,973,354, French Patent 1,216,613, German Patent 837,537 and British Patent 701,789.

Conversion of the 6,11(5H)-morphanthridinedione to the corresponding 11-ketal can be readily effected by bringing the 6,11(5H)-morphantridinedione and a lower alcohol or a lower glycol together in admixture in the presence of a suitable acidic catalyst such as p-toluene sulfonic acid, sulfuric acid, phosphoric acid and hydrochloric acid. The ketalization can be effected from ambient temperature to 200° C. The reflux temperature is generally preferred. An excess of the alcohol or glycol can be used as the reaction medium although other liquid mediums such as benzene, toluene or xylene can be used. After the ketalization reaction is terminated the reaction mixture can be cooled, neutralized and the desired product isolated by conventional procedures.

Some of the ketals that are produced as described are:

6,11(5H)-morphanthridinedione-11-ethylene ketal,
6,11(5H)-morphanthridinedione-11-propylene ketal,
6,11(5H)-morphanthridinedione-11-dimethyl ketal and
6,11(5H)-morphanthridinedione-11-diethyl ketal.

The addition of a 5-substituent to the 6,11(5H)-morphanthridinedione-11-ketals is readily effected by the use of a suitable alkylating agent such as a lower alkyl halide including methyl chloride, ethyl bromide, a phenyl-lower alkyl halide such as benzylchloride and phenethyl-chloride or a lower alkenyl halide such as allybromide. Instead of the halides, one can also use the corresponding tosylates, i.e., methyl tosylate and the like. The 6,11(5H)-morphanthridinedione-11-ketal is advisably used in the form of an alkali metal salt thereof, e.g., lithium, sodium or potassium salt. These salts are prepared by reacting a 6,11(5H)-morphanthridinedione-11-ketal with (a) an alkali metal in the presence of toluene or xylene, (b) an alkali metal aryl compound such as phenyl lithium, (c) a sodium or potassium lower alkoxide such as the methoxide, ethoxide or butoxide, (d) an alkali metal in the presence of ammonia, (e) lithium or potassium amide, or (f) a lithium, sodium or potassium hydride.

The reaction is conveniently achieved by bringing the 6,11(5H)-morphanthridinedione-11-ketal alkylating agent and condensing agent together in an inert liquid reaction medium such as toluene, xylene and benzene. The reaction is promoted by heating the mixture, such as at the reflux temperature. After the reaction is terminated water can be added to the mixture to decompose any excess condensing agent, the organic layer separated and the product isolated by conventional manipulative techniques.

Representative of the products formed as described are:

5-methyl-6,11-morphanthridinedione-11-ethylene ketal,
5-ethyl-6,11-morphanthridinedione-11-ethylene ketal,
5-trityl-6,11-morphanthridinedione-11-propylene ketal,
5-benzyl-6,11-morphanthridinedione-11-ethylene ketal,
5-phenethyl-11-dimethoxy-6,11-morphanthridine and
5-allyl-11-diethoxy-6,11-morphanthridine.

The 6-keto group of the 5-substituted-6,11-morphanthridinedione-11-ketals can be reduced by reacting it with lithium aluminum hydride in a suitable reaction medium such as tetrahydrofuran, diethylether or dibutylether. Reflux temperature is highly suitable for promoting the reaction. The reaction is substantially completed in a few hours. The product can be isolated by adding water to the reaction mixture to decompose unreacted lithium aluminum hydride, separating the organic layer and drying it and evaporating to dryness.

Some of the 5-substituted-5,6-dihydro-11-morphanthridones-11-ketals which can be produced as described are:

5-methyl-5,6-dihydro-11-morphanthridone-11-ethylene ketal,
5-ethyl-5,6-dihydro-11-morphanthridone-11-propylene ketal,
5-benzyl-5,6-dihydro-11-morphanthridone-11-dimethyl ketal and
5-allyl-5,6-dihydro-11-morphanthridone-11-diethyl ketal.

Hydrolysis of such ketals with a mineral acid such as hydrochloric acid in a suitable liquid reaction medium such as water, ethanol, methanol, isopropanol and dioxane at a temperature of about 0° C. to 100° C. gives the desired 11-keto compounds such as named herein previously.

The compounds of this invention form water soluble acid addition salts with inorganic and organic acids such as hydrochloric acid, hydrobromic acid, sulphuric acid, phosphoric acid, methane sulphonic acid, ethane disulphonic acid, acetic acid, nitric acid, maleic acid, succinic acid, tartaric acid, benzoic acid, phthalic acid and cyclohexyl sulfamic acid.

The compounds also form lower alkyl quaternary ammonium salts such as methyl chloride, ethyl bromide and diethyl sulfate.

The compounds of this invention, and especially those of Formulas 1 and 2, other than the intermediate alkali metal salts, have anticholimergic and analgetic activity. They thus can be used in pharmacological studies and as screening agents for evaluating compounds for these activities. In addition, these compounds have antispasmodic, antidepressant and tranquilizing effects. The compounds are antipsychotic, antianxiety, mood elevating and mood leveling agents. They are skeletal muscle relaxants and also reduce aggressiveness. For the described uses in animals the bases or acid addition salts would be used except that quaternary ammonium salts would be used for anticholinergic activity. Actual use in animals, including humans, for the described purposes is indicated. They can also be used as neutralizing agents and in purifying penicillin with which they form salts.

The compounds can be administered to animals as pure compounds, in the form of a pharmaceutically acceptable nontoxic acid addition salt, but to obtain a more practical size to dosage relationship one or more of the compounds is combined with a suitable pharmaceutical carrier and made into unit-dosage forms. Administration can be oral or parenteral.

Pharmaceutical carriers which are liquid or solid can be used. The preferred liquid carrier is water. Flavoring materials can be included in the solutions as desired.

Solid pharmaceutical carriers such as starch, sugar and talc can be used to form powders. The powders can be used as such or be tableted, or be used to fill gelatin capsules. Suitable lubricants like magnesium stearate, binders such as gelatin and disintegrating agents like sodium carbonate in combination with citric acid can be used to form the tablets.

Unit dosage forms such as tablets and capsules can contain any suitable predetermined amount of one or more of the compounds and can be administered one or more at a time at regular intervals. Such unit dosage forms can contain 1 to 300 mg. or more of an active compound of this invention. The total amount of active compound administered must be ultimately fixed by reference to the animal and disease to be treated. However, about 1 to 300 mg. four times daily for a total daily dose of 4 to 1200 mg. is suitable.

The presently most interesting compound as an antidepressant, tranquilizer, antipsychotic agent, mood elevator and skeletal muscle relaxant is 5-methyl-11-(3-dimethylaminopropylidene)-5,6-dihydromorphanthridine as the base or an acid addition salt.

This application is a continuation-in-part of our copending application, Serial No. 111,141, filed May 19, 1961, now abandoned.

The following examples are presented to illustrate the invention.

EXAMPLE 1

*5-Methyl-11-(N-Methyl-4-Hydroxy-4-Piperidyl)-5,6-Dihydromorphanthridine*

A stirred solution of 66.4 g. (0.318 mole) of 5-methyl-5,6-dihydromorphanthridine in 380 cc. of tetrahydrofuran was covered with nitrogen, cooled in icewater and treated with a solution of 206 cc. (0.353 mole) of commercial butyl-lithium solution in 290 cc. of ether over a period of 25 minutes. The dark brown solution was stirred at room temperature for 6 hours after which time there was added in 1 hour at room temperature a solution of 35.9 g. (0.318 mole) of N-methyl-4-piperidone in 118 cc. of ether. After stirring for an additional 8 hours, 200 cc. of water was added. The organic layer was separated, washed once with 100 cc. of water and dried over calcium sulfate. After removal of the solvent, the residue was distilled yielding a forerun of 44.9 g. of 5-methyl-5,6-dihydromorphanthridine and the desired product, 24.5 g. (24% or 74% based on nonrecovered N-methyl-5,6-dihydromorphanthridine), B.P. 200–220° C. (0.15 mm.).

*Analysis.*—Calcd. for $C_{21}H_{26}N_2O$: N, 8.69. Found: N, 8.13.

Redistillation of the base afforded a fraction, B.P. 210–220° C. (0.6 mm.) which could be crystallized from acetonitrile. The product obtained after several recrystallizations had a M.P. 152–153° C.

*Analysis.*—Calcd. for $C_{21}H_{26}N_2O$: N, 8.69. Found: N, 8.45.

EXAMPLE 2

*5-Methyl-11-(N-Methyl-4-Acetoxy-4-Piperidyl)-5,6-Dihydromorphanthridine*

To a solution of 27 g. (0.837 mole) of 5-methyl-11-(N-methyl-4-hydroxy-4-piperidyl)-5,6-dihydromorphanthridine in 500 cc. of acetic anhydride was added 19 g. of toluene-sulfonic acid. After keeping the mixture at 100° C. for 5 hours, the excess acetic anhydride was removed by distillation. Dilute sodium hydroxide was added and the dark material was extracted with benzene, washed with water and dried over calcium sulfate. After removal of the benzene, 18 g. of crude acetate was obtained, identified by its infrared spectrum which showed a carbonyl absorption band at $5.8\mu$ and a carbon-oxygen stretch band at $8.08\mu$.

EXAMPLE 3

*5-Methyl-11-(N-Methyl-4-Piperidylene)-5,6-Dihydromorphanthridine*

The 18 g. of crude ester from Example 2 was pyrolyzed by heating in an oil bath at 210° C. for ¾ hour during which acetic acid was liberated. Distillation of the residue afforded a fraction, 8.1 g., B.P. 180–200° C. (0.05 mm.).

*Analysis.*—Calcd. for $C_{21}H_{24}N_2$: N, 9.20. Found: N, 8.98.

EXAMPLE 4

*6,11(5H)-Morphanthridinedione-11-Ethylene Ketal*

A mixture of 44.6 g. (0.2 mole) of 6,11(5H)-morphanthridinedione, 1250 cc. of ethylene glycol and 0.9 g. of p-toluene-sulfonic acid were stirred and heated to reflux. Approximately 250 cc. of distillate was collected dropwise over a period of ca. 3 hours. The mixture was then cooled, the acid was neutralized by the addition of an equivalent amount of alcoholic sodium ethylate and the reaction mixture was poured with stirring into 5 liters of water. The solid was collected by filtration, rinsed with water, air-dried and recrystallized from 360 cc. of ethylacetate to give 24 g. of the ketal, M.P. 223–224° C.

*Analysis.*—Calcd. for $C_{16}H_{13}NO_3$: C, 71.90; H, 4.94; N, 5.24. Found: C, 71.53; H, 4.84; N, 5.28.

EXAMPLE 5

*5-Methyl-6,11-Morphanthridinedione-11-Ethylene Ketal*

To a solution of 18.7 g. (0.07 mole) of 6,11(5H)-morphanthridinedione-11-ethylene ketal in 350 cc. of toluene and 100 cc. of dioxane was added a slurry of 2.72 g. (0.07 mole) of sodamide in 100 cc. of toluene. After a 3 hours reflux period, the mixture was cooled and a solution of 28.4 g. (0.2 mole) of methyliodide in 50 cc. of toluene was added in 0.5 hour. The mixture was then stirred 12 hours at ambient temperature followed by 24 hours of stirring at reflux temperature. Water (15 cc.) was added to the cooled reaction mixture, the organic layer was separated and concentrated after drying over potassium carbonate. There was obtained 14.3 g. product, M.P. 175–178° C. A sample, purified by sublimation, had a M.P. of 183–185° C.

EXAMPLE 6

*5-Methyl-11-Morphanthridone-11-Ethylene Ketal and 5-Methyl-5,6-Dihydro-11-Morphanthridone*

A solution of 20 g. (0.07 mole) of 5-methyl-6,11(5H)-morphanthridinedione-11-ethylene ketal in 250 cc. of tetrahydrofuran (T.H.F.) was added dropwise to a stirred slurry of 2.7 g. of lithium aluminum hydride in 150 cc. of T.H.F. After a 5.5 hr. reflux period the cooled mixture was decomposed by dropwise addition of 25 cc. of water, the organic layer was separated, dried over potassium carbonate, filtered and taken to dryness to leave 28.3 g. of 5-methyl-11-morphanthridone-11-ethylene ketal as a very viscous oil. The oil was dissolved in 195 cc. of 85% aqueous ethanol, 15 cc. of HCl (38%) was added and the solution was heated for 2 hrs. on a steambath, cooled and poured into 1 liter of water. The solid was collected by filtration and recrystallized from methanol to give 8.2 g. product, M.P. 108–110° C. A resublimed sample melted at 115° C.

EXAMPLE 7

5-Methyl-11-Hydroxy-11-(3-Dimethylaminopropyl)-5,6-Dihydromorphanthridine

A flask was charged with 1.9 g. (0.078 atom) of magnesium turnings, 25 cc. of tetrahydrofuran (T.H.F.) and a trace of calcium hydride. The reaction was started by the addition of 1 g. of methyl iodide and a crystal of iodine. At reflux temperature a solution of 9.49 g. (0.078 mole) of 3-dimethylaminopropyl chloride in 25 cc. of T.H.F. was added dropwise and the reaction mixture was stirred and refluxed for another hour. The solution was then cooled in ice water, and a solution of 8.9 g. (0.039 mole) of 5-methyl-5,6-dihydro-11-morphanthridone in 75 cc. of T.H.F. was added dropwise. After stirring at ambient temperature for 18 hours, the T.H.F. was evaporated in vacuo at 50° C. and replaced by 75 cc. of benzene. The solution was then hydrolyzed in the cold by dropwise addition of 19.5 cc. of water. The precipitate was filtered off and the filtrate was taken to dryness, giving 12 g. of brown residue which, after recrystallization from 55 cc. of ethanol, gave 7.6 g. compound, M.P. 133.5–134° C.

*Analysis*—Calcd. for $C_{20}H_{26}N_2O$: C. 77.37; H, 8.44; N, 9.03. Found: C, 77.29; H, 8.46; N, 9.20.

EXAMPLE 8

5-Methyl-11-(3-Dimethylaminopropylidene)-5,6-Dihydromorphanthridine

Into a solution of 6.3 g. (0.0203 mole) of 5-methyl-11-hydroxy-11-(3-dimethylaminopropyl) - 5,6 - dihydromorphanthridine in 250 cc. of chloroform was passed dry hydrochloric acid until the pH reached 1. An orange oil separated. To this mixture was added a solution of 5.5 g. (0.07 mole) of acetyl chloride in 50 cc. of chloroform and the reaction mixture was stirred and heated on a steambath for 1 hour. The solution was taken to dryness and the residue was taken up in water, made alkaline with potassium hydroxide and extracted with ether. The ethereal solution was dried over potassium carbonate, filtered and taken to dryness to give 5.7 g. of crude base. This base was converted to the dicyclohexylsulfamate by dissolving it in 50 cc. of ethanol and 100 cc. of ether and adding a solution of 8.05 g. of cyclohexylsulfamic acid in 50 cc. of alcohol and 50 cc. of ether. Further addition of 150 cc. of ether caused the salt to crystallize, 11.4 g., M.P. 138–139° C.

*Analysis.*—Calcd. for $C_{32}H_{50}N_4O_6S_2$: N (non aq. titration), 4.30; N, 8.61; C, 59.04; H, 7.74. Found: N (non aq. titration), 4.32; N, 8.59; C, 58.50; H, 8.05.

Various changes and modifications of the invention can be made and, to the extent that such variations incorporate the spirit of this invention, they are intended to be included within the scope of the appended claims.

What is claimed is:
1. A compound selected from the group consisting of those of the formulae

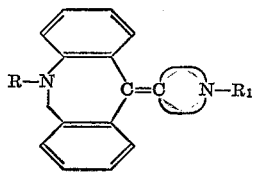

and

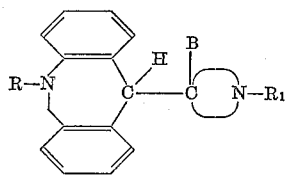

and nontoxic physiologically acceptable acid addition salts and quaternary ammonium salts thereof with a member of the group consisting of lower alkyl halides and lower alkyl sulfates wherein B is a member of the group consisting of the hydroxy group and groups of the formula

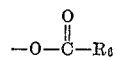

wherein $R_6$ is lower alkyl, R is a member of the group consisting of hydrogen, lower alkyl, lower alkenyl, phenyl-lower alkyl and phenyl-lower alkenyl, $R_1$ is a member of the group consisting of hydrogen, lower alkyl, phenyl-lower alkyl, lower alkenyl, phenyl-lower alkenyl and trityl, and

is a cyclicamino group of the group consisting of 3-piperidyl, 4-piperidyl, 3-pyrrolidyl, 3-homopiperidyl and 4-homopiperidyl.

2. 5-lower alkyl-11-(N-lower alkyl-4-hydroxy-4-piperidyl)-5,6-dihydromorphanthridine.

3. 5-lower alkyl-11-(N-lower alkyl-3-hydroxy-3-piperidyl)-5,6-dihydromorphanthridine.

4. 5-methyl-11-(N-methyl-4-hydroxy-4-piperidyl) - 5,6-dihydromorphanthridine.

5. 5-lower alkyl-11-(N-lower alkyl-4-piperidylene)-5,6-dihydromorphanthridine.

6. 5-lower alkyl-11-(N-lower alkyl-3-piperidylene)-5,6-dihydromorphanthridine.

7. 5-methyl-11-(N-methyl-4-piperidylene)-5,6-dihydromorphanthridine.

8. 5-methyl-11-(N-methyl-4-acetoxy-4- piperidyl) - 5,6-dihydromorphanthridine.

References Cited in the file of this patent

UNITED STATES PATENTS

| | | |
|---|---|---|
| 2,655,503 | Phillips et al. | Oct. 13, 1953 |
| 2,773,875 | Finkelstein et al. | Dec. 11, 1956 |
| 2,861,987 | Martin et al. | Nov. 25, 1958 |
| 2,955,073 | De Beer | Oct. 4, 1960 |
| 2,973,354 | Werner | Feb. 28, 1961 |
| 3,024,166 | Kuna et al. | Mar. 6, 1962 |
| 3,055,903 | Renz et al. | Sept. 25, 1962 |

OTHER REFERENCES

Petersen et al.: Arzneimittel Forschung, vol. 8, No. 7, page 396 (July 1958).

UNITED STATES PATENT OFFICE
CERTIFICATE OF CORRECTION

Patent No. 3,153,652                                        October 20, 1964

Alexander E. Drukker et al.

It is hereby certified that error appears in the above numbered patent requiring correction and that the said Letters Patent should read as corrected below.

Column 1, lines 18 to 27, the lower portion of the formula reading:

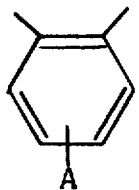      read      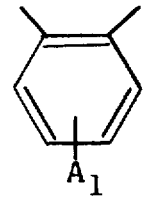

lines 42 to 44, the formula should appear as shown below instead of as in the patent:

column 4, line 63, for "cyclophenyl" read -- cyclopentyl --;
column 9, line 68, for "allybromide" read -- allylbromide --;
column 11, line 74, for "(0.837 mole)" read -- (0.0837 mole) --.

Signed and sealed this 16th day of March 1965.

(SEAL)
Attest:

ERNEST W. SWIDER                               EDWARD J. BRENNER
Attesting Officer                               Commissioner of Patents